United States Patent Office 3,097,339
Patented July 9, 1963

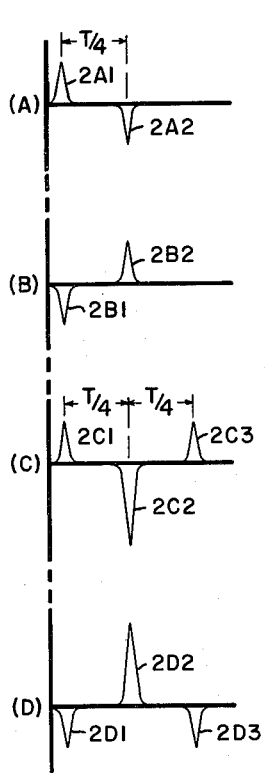
Fig. 2
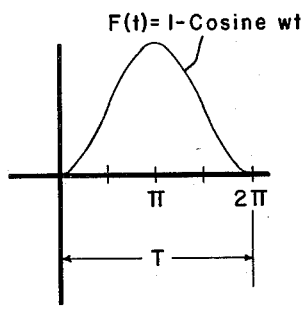
F(t)= 1-Cosine wt
Fig. 3
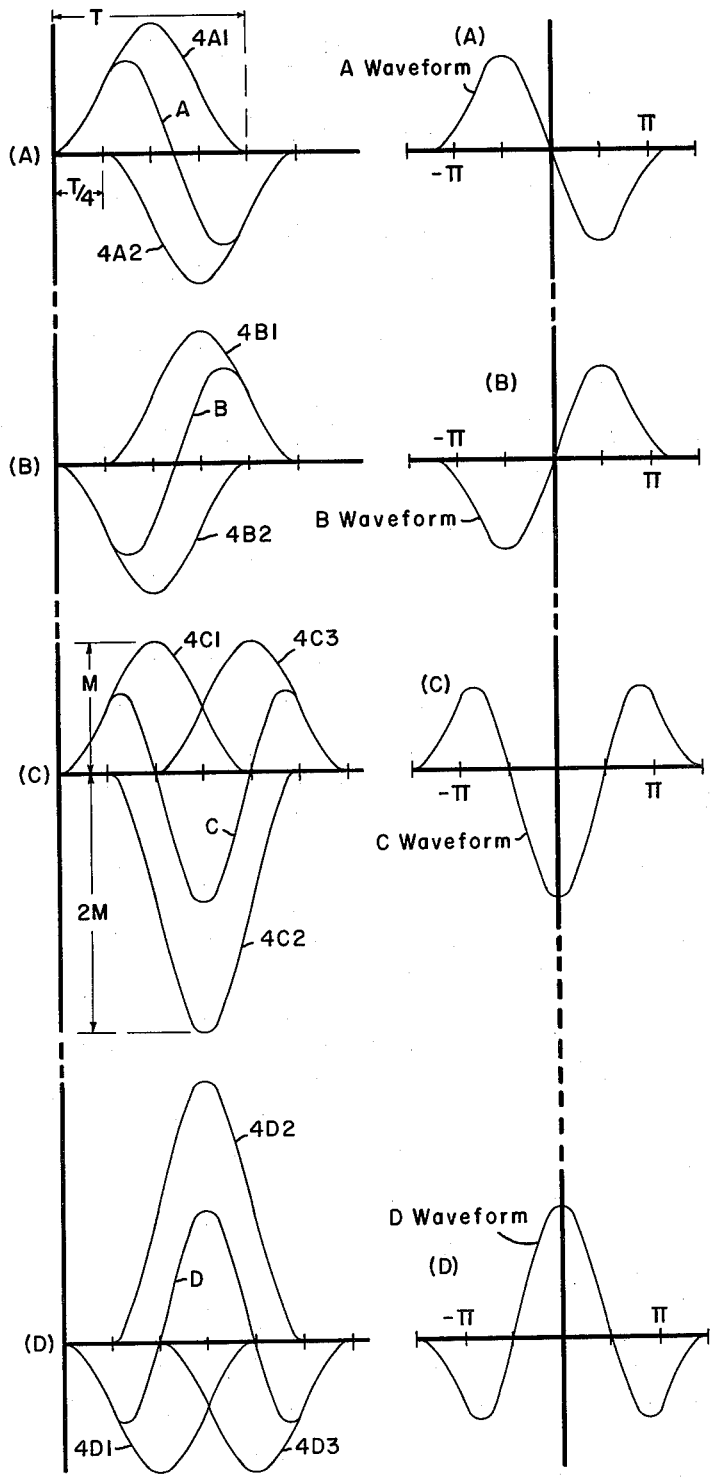
Fig. 4
Fig. 5

3,097,339
INDIVIDUALLY TRIGGERED PULSE GENERATORS FEEDING A BUFFER ADDER TO PRODUCE PARTICULAR OUTPUT WAVEFORMS
Gerard K. McAuliffe, Baltimore, Md., assignor to Westinghouse Electric Corporation, East Pittsburgh, Pa., a corporation of Pennsylvania
Filed Aug. 19, 1959, Ser. No. 834,896
8 Claims. (Cl. 328—61)

This invention relates to a method and apparatus for generating and detecting electrical signals having predetermined symbolic waveforms.

In the copending application Serial No. 833,450, filed August 13, 1959, by Richard F. J. Filipowsky, entitled "Signal Transmission System," assigned to the assignee of the present invention and now abandoned, there is disclosed a transmission system for transmitting information. The transmission system disclosed in the application employs four bipolar signals having discrete symbolic waveforms for transmitting information. The system disclosed in the above application employs four symbolic signals shown in this application, for transmitting information. These discrete signals which are more specifically described in the above copending application, have various unique characteristics which enable accurate transmission of the binary information at a relatively high information rate. These waveforms are D.C. free, that is, they are pure alternating current waveforms. The waveforms are made up of sine or cosine segments and have gradually increasing and gradually decreasing leading and trailing edges so as to result in a relatively narrow bandwidth.

Accordingly, an object of the invention is to provide a matched filter for a predetermined waveform to be utilized in generating and detecting signals having such a waveform.

Another object of the invention is to provide apparatus and a method for selectively producing a plurality of bipolar signals having waveforms useful in transmitting information.

Still another object of the invention is the provision of a waveform generator and detector for efficiently and accurately producing and detecting a signal employed in transmitting information and having a predetermined waveform.

Still a further object of the invention is to provide a waveform generator for producing a plurality of signals having a relatively small bandwidth.

A further object of the invention is the provision of a method and an apparatus for producing a plurality of predetermined bipolar intelligence signals having a relatively small bandwidth.

A further object of the invention is to provide a method and apparatus for accurately detecting a plurality of bipolar information signals having predetermined waveforms.

Other and incidental objects of the invention will be apparent to those skilled in the art from a reading of the following specification and inspection of the accompanying drawings, in which:

FIG. 2 illustrates pulses occurring in the embodiment shown in FIG. 1 which are useful in describing the invention;

FIG. 3 illustrates a waveform useful in describing the embodiment illustrated in FIG. 1;

FIG. 4 illustrates waveforms occurring in the embodiment shown in FIG. 1 which are useful in explaining the invention;

FIG. 5 illustrates waveforms produced by the embodiment shown in FIG. 1; and

Figure 1:
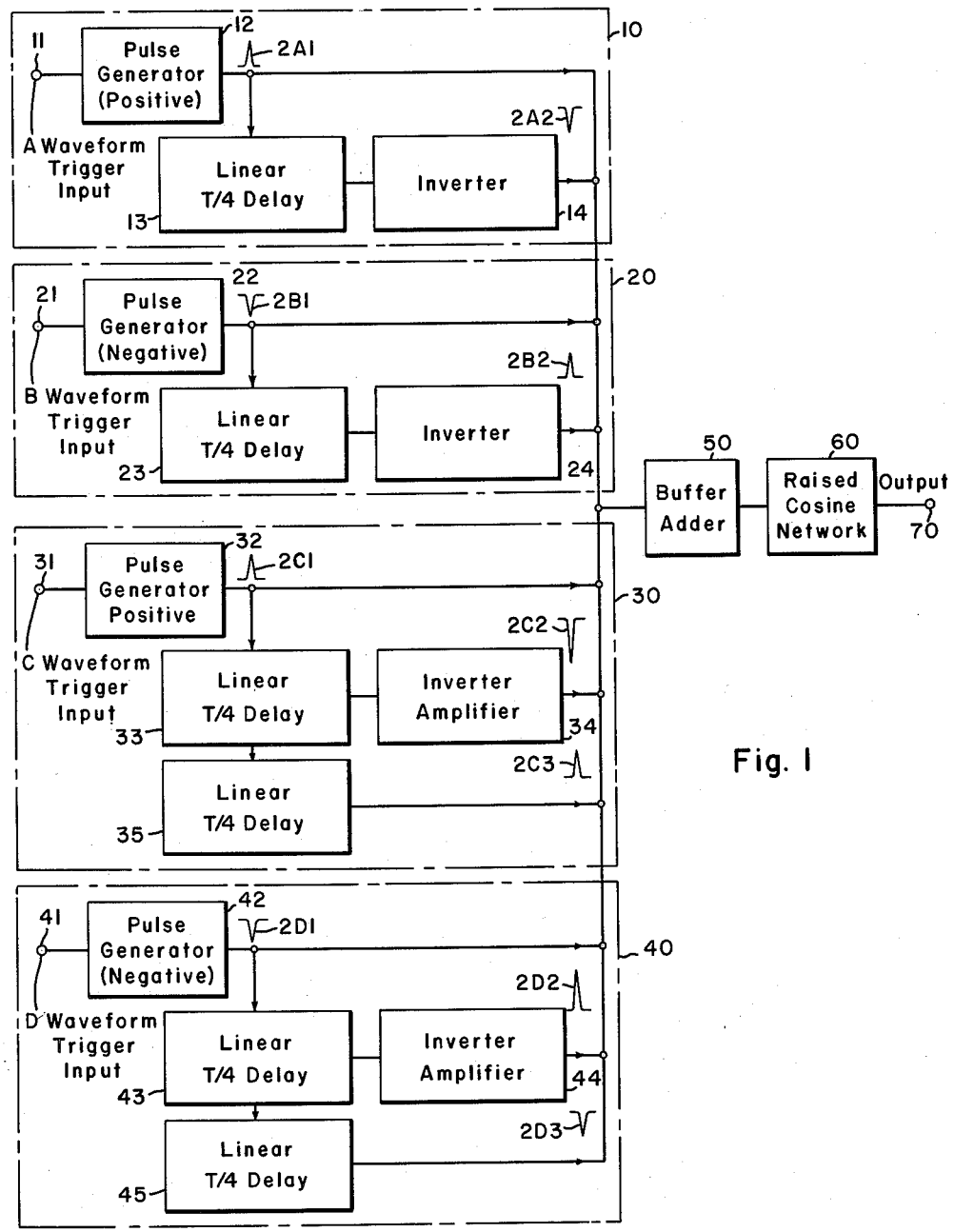
FIGURE 1 illustrates a schematic diagram in block form of an embodiment of the invention.

The embodiment of the invention illustrated in FIG. 1 comprises generally four pulse sequencers 10, 20, 30 and 40. When an input trigger pulse is applied to any one of the units 10, 20, 30 or 40, they produce output pulses which are sent through a buffer adder 50 to a raised cosine matched filter 60. The raised cosine matched filter 60 is a type of network which produces a raised cosine output when a pulse is applied to the input thereof. Such a network is shown in the Proceedings of I.E.E. London vol. 99, part 3A, 1952, page 436 by MacDiarmid. This network 60 may be of any type wherein the output signal having a raised cosine waveform has the same polarity as the polarity of the input pulse and additionally the peak amplitude of the waveform is dependent upon the area of the input pulse. The output of such network is illustrated in FIG. 3 and the formula of this waveform is:

$$F(t) = 1^1 - \text{cosine } W_0 t$$

When an input pulse is applied to one of the pulse sequencers 10, 20, 30, or 40, they produce output pulses illustrated in FIGS. 2A, 2B, 2C or 2D, respectively. These pulses shown in FIG. 2 are then applied through buffer adder 50 to the cosine matched filter 60 and the resulting output waveforms for each of these sequencers is illustrated in FIGS. 5(A), 5(B), 5(C) or 5(D).

If the waveform A is desired, as shown in FIG. 5(A), the pulse sequencer 10 is actuated by an input pulse being applied to input terminal means 11. This actuates a pulse generator 12 to produce a positive-going pulse 2A1 as shown in FIG. 2(A). The area of pulse 2A1 will be constant regardless of the area or amplitude of the input pulse 11. The pulse generator 12 is connected to the raised cosine network 60 through buffer 50 so that the pulse 2A1 will be applied through buffer 50 to the cosine network 60. This pulse will thereby effect production of a waveform 4A1 as shown in FIG. 4(A), which is a positive-going raised cosine waveform. The output of the pulse generator 12 is also connected to a linear delay 13. This delay will effect a delay of T/4, T being the time length of the pulse output of the raised cosine waveform shown in FIG. 3. The output of the delay 13 is then passed through an inverter 14 to produce a pulse 2A2 shown in FIG. 2(A). Pulse 2A2 is delayed a time T/4 after the occurrence of pulse 2A1 and is negative going. The output of the inverter 14 is connected to the raised cosine network 60 through a buffer adder 50. Viewing FIG. 2(A) and FIG. 4(A), it is seen that the negative-going pulse 2A2, occurring a time T/4 after the positive-going pulse 2A1, will effect the production of a negative-going raised cosine waveform 4A2 when it is applied to the raised cosine network 60. The area of the negative-going pulse 2A2 is equal to the area of a positive-going pulse 2A1 so that as shown in FIG. 4(A), the output of the raised cosine network 60 will be a composite or addition of the raised cosine waveform 4A1 and the negative-going raised cosine waveform 4A2 which occurs a time period T/4 after the commencement of the raised cosine waveform 4A1. The resulting output waveform is the wave A as illustrated in FIG. 4A and also in FIG. 5A.

The positive-going waveform 4A1 is described by the equation $$f_1(t) = 1 - \cos \frac{2}{T} \pi t$$

whereas waveform 4A2 is described by the equation $$f_2(t) = f_1(t)\left(t - \frac{T}{4}\right)$$

Adding $f_1(t)$ and $f_2(t)$ and changing the point of origin to $$\frac{5}{8}T$$

the waveform A is described by the following equations:

$$f(t) = 0 \text{ for } -\infty \leq t \leq -\frac{5}{8}T$$

$$f(t) = \frac{1}{\sqrt{2}}\left[1 - \cos\left(\omega_0 t + \frac{5}{4}\pi\right)\right] \text{ for } -\frac{5}{8}T \leq t \leq -\frac{3}{8}T$$

$$f(t) = \sin(\omega_0 t + \pi) \text{ for } -\frac{3}{8}T \leq t \leq -\frac{3}{8}T$$

$$f(t) = -\frac{1}{2}\left[1 - \sin\left(\omega_0 t - \frac{3}{4}\pi\right)\right] \text{ for } \frac{3}{8}T \leq t \leq \frac{5}{8}T$$

$$f(t) = 0 \text{ for } \frac{5}{8}T \leq t \leq \infty$$

Hence the generator disclosed will produce a signal having a waveform as disclosed in copending application Serial No. 731,915, filed April 30, 1958 and entitled "Generator for Skew Sine Waveforms" and also disclosed in copending application Serial No. 833,450, filed August 13, 1959 and entitled "Signal Transmission System" with the same assignee as the assignee of the present invention having assignee identification No. 31,180. The inventor in both of these applications is Richard R. J. Filipowsky. The use of these waveforms in a communications system, is described in detail in these copending applications.

If a waveform B, as identified as an inverted skew sine waveform is desired, the pulse generator and squencer 20 is actuated by applying a trigger input pulse to the input terminal means 21. This actuates a pulse generator 22 which produces a negative-going pulse 2B1, as shown in FIG. 1 and FIG. 2B. As in the pulse generator and sequencer 10, the negative-going pulse 2B1 will be of constant area and amplitude regardless of the amplitude of the input trigger pulse applied at the input means 21. The pulse generator 22 is connected to the raised cosine network 60 through buffer 50, so that pulse 2B1 commences the production of a negative-going raised cosine 4B2, as shown in FIG. 4B. The pulse generator 22 is also connected to a linear delay 23. Delay 23 passes the delayed pulse to an inverter 24 to thereby generate pulse 2B2. Pulse 2B2 is of equal area and of opposite polarity to pulse 2B1. As shown in FIGS. 1 and 2(B) pulse 2B2 is positive going. The output of the inverter 24 is connected to the raised cosine network 60 through buffer adder 50. Viewing of FIG. 2(B) and FIG. 4(B), it is seen that a $T/4$ after the application of negative pulse 2B1 to the raised cosine network 60, the positive-going pulse 2B2 will be applied thereto so as to effect the commencement of a positive-going raised cosine waveform 4B1. The area of the positive-going pulse 2B2 is equal to the area of the negative-going pulse 2B1 so that the raised cosine pulses 4B1 and 4B2 will have an equal peak amplitude and area. As seen in FIG. 4(B), the effect of the two pulses 2B1 and 2B2 is an output waveform from the raised cosine network 60 similar to that identified as B waveform in FIG. 4(B). This waveform, as stated above, is identified as an inverted skew sine waveform, shown in FIG. 5(B) and is the inversion of waveform A.

Hence, it is seen by employing one single basic waveform, namely the raised cosine waveform, the waveform A, identified as a skew sine waveform or the waveform B, identified as the inverted skew sine waveform is produced. Additionally in the present invention, only a single raised cosine need be employed to produce either of these waveforms.

If it is desired to produce the waveform C as illustrated in FIG. 5(C), identified as the triple raised cosine waveform, a trigger pulse is applied to the pulse generator and sequencer 30. This trigger is applied to the input terminal means 31 which actuates the pulse generator 32. Pulse generator 32 when actuated produces a positive-going output pulse 2C1 as shown in FIG. 2(C). The output of pulse generator 32 is connected to the raised cosine network 60 through buffer 50 so that the pulse 2C1 effects the commencement of the production of a raised cosine waveform 4C1 as shown in FIG. 4(C). The output of the pulse generator 32 is also connected to a linear delay 33. Hence when the positive-going pulse 2C1 is applied to the delay 33, the output of the delay 33 is a pulse similar to pulse 2C1 but delayed a time $T/4$. In order to double the area thereof, the output of the delay 33 is fed through an inverter amplifier 34. The output of the inverter 34 is a negative-going pulse 2C2. The area of the negative-going pulse 2C2 is twice the area of the positive-going pulse 2C1. It can be understood that the time delay 33 and the inverter amplifier 34 could be done by other means. The output of the inverter amplifier 34 is also connected to the raised cosine network 60 through the buffer 50 so as to effect the commencement of production of a negative-going raised cosine waveform 4C2, as shown in FIG. 4(C), commencing at a time period $T/4$ after the beginning of the raised cosine waveform 4C1. Since pulse 2C2 is twice the size of pulse 2C1, waveform 4C2 will be correspondingly larger than waveform 4C1.

The time delay 33 is also connected to a second linear time delay 35 having a delay of $T/4$. The delay 35 will further delay pulse 2C1 a time $T/4$ so to produce at the output thereof pulse 2C3. Positive-going pulse 2C3 as shown in FIG. 2(C) has an area and amplitude equal to the area and amplitude of the previous positive-going pulse 2C1. The delay 35 is also connected to the raised cosine network 60 through buffer adder 50. Consequently the pulse 2C3 effects the production of a third raised cosine waveform illustrated as waveform 4C3 in FIG. 4(C). This raised cosine waveform is positive-going since the pulse 2C3 is positive-going and has the same area and amplitude as the raised cosine waveform 4C1 since the pulses 2C1 and 2C3 are equal in area.

Viewing FIG. 4C, it is seen that the output waveform from the raised cosine network 70 effected by the pulse generator and sequencer 30, is a composite or addition of three raised cosine waveforms, 4C1, 4C2, and 4C3, with the waveforms 4C1 and 4C3 being equal in peak amplitude, positive-going and with 4C3 occurring a time period $T/2$ after the commencement of the waveform 4C1. The raised cosine waveform 4C2 commences at a period of time $T/4$ after the commencement of the raised cosine waveform 4C1, and is negative-going having a peak amplitude twice the peak amplitude of the raised cosine waveform 4C1 and 4C3. The effect of these three waveforms is a resulting output waveform illustrated as C waveform in FIGS. 4(C), and 5(C) and identified as the triple raised cosine waveform.

Thus it is seen in the preferred embodiment of the invention illustrated the waveform C is produced as a composite or addition of a single waveform of varying phase and amplitude. More specifically, this waveform is produced by employing three waveforms, two of the same polarity and amplitude and one of the opposite polarity and twice the amplitude of the other two, with all three waveforms varying in phase.

The waveform shown in FIG. 5(D) as D waveform and identified as an inverted triple raised cosine waveform, is the inversion of the waveform shown in FIG. 5C. If it is desired to produce this waveform the pulse generator and sequencer 40 is actuated by applying an input trigger pulse to the input terminal means 41. This action actuates a pulse generator 42 which produces a negative-going pulse 2D1. The pulse generator 42 is connected to raised cosine 60 through buffer adder 50 so that pulse 2D1 commences production of a negative-going raised cosine waveform illustrated as 4D1 in FIG. 4(D). The output of the pulse generator 42 is also connected to linear delay 43. The negative-going pulse 2D1 is delayed a time $T/4$ by the delay 43. This delayed pulse is then applied to an inverter amplifier 44 so as to produce a positive going pulse 2D2. The amplitude and area of the pulse 2D2 is twice that of the negative-going pulse 2D1. Inverter 44 is connected to raised cosine network 60 through buffer 50 so as to effect the commencement of the production of a positive-going raised cosine 4D2 as shown in FIG. 4(D), which has an amplitude twice the amplitude of the raised cosine waveform 4D1. The amplitude of the pulse 2D2 is made twice the magnitude of the negative-going pulse 2D1 by the circuit values in the inverter amplifier 44. The output of the delay 43 is fed to another delay 45. The delay 45 will delay the negative-going pulse from delay 43 a time $T/4$ and generates a pulse 2D3. The negative-going pulse 2D3 occurs a time $T/4$ after the positive-going pulse 2D2. The amplitude of the negative-going pulse 2D3 is the same as the amplitude of the negative pulse 2D1. The output of delay 45 is also connected to the raised cosine network 60 through the buffer 50 so as to effect the commencement of a negative-going raised cosine waveform 4D3 as shown in FIG. 4D.

Hence, it is seen that, as shown in FIG. 2D, the pulses 2D1, 2D2 and 2D3 will be sequentially applied to the cosine network 60 and will be spaced apart a time $T/4$. These waveforms will tend to effect production of three waveforms illustrated in FIG. 4(D) as 4D1, 4D2 and 4D3. The resulting output will be a waveform D illustrated in FIG. 4D and FIG. 5D. This waveform will be an inversion of the waveform C illustrated in FIG. 5(C). In the production of this waveform as in the production of the other waveforms a single basic waveform is employed, namely the raised cosine waveform, with varying phase and amplitude, to produce the desired output waveform. More specifically, three raised cosine waveforms tend to be generated in the raised cosine network 60, which waveforms are spaced apart a period of time $T/4$ so as to produce the desired output waveform.

Summarizing briefly, when an A waveform, illustrated in FIG. 5(A), is desired, the pulse generator and sequencer 10 is actuated to produce the two pulses of opposite polarity and equal magnitude, identified as 2A1 and 2A2, and illustrated in FIG. 2A. These two pulses tend to generate raised cosine waveforms 4A1 and 4A2 within the passive raised cosine network 60, as shown in FIG. 4. The resulting output waveform is that illustrated by A in FIG. 4A, which is a composite of the positive-going raised cosine waveform 4A1 and the negative-going raised cosine waveform 4A2 which commences at a period of time $T/4$ after the raised cosine waveform 4A1.

When it is desired to produce a waveform B, as illustrated in FIG. 5(B), the pulse generator and sequencer 20 is actuated. When the sequencer 20 is actuated, it produces two pulses 2B1 and 2B2 of equal magnitude and opposite polarity, illustrated in FIG. 2(B). These two pulses tend to produce the positive-going raised cosine waveform 4B1 and the negative-going raised cosine waveform 4B2 within the passive raised cosine network 60. The resulting output of these two waveforms is the waveform illustrated in FIG. 5(B) and FIG. 4(B), identified as B waveform.

If the waveform illustrated as C waveform in FIG. 5C is desired, the pulse generator and sequencer 30 is actuated so as to produce three pulses 2C1, 2C2 and 2C3, shown in FIG. 2(C). The resulting output from the passive raised cosine network 60 is a composite of the positive-going raised cosine waveforms 4C1 and 4C3 which are spaced apart a period of time $T/2$, and the negative-going raised cosine waveform 4C2 which is spaced apart a period of time $T/4$ after the commencement of raised cosine waveform 4C1. The raised cosine waveform 4C2 has a peak amplitude twice the peak amplitude of the two raised cosine waveforms 4C1 and 4C3. The resulting output is a composite of these three waveforms 4C1, 4C3 and 4C2, to produce the C waveform illustrated in FIGS. 5C and 4C.

If it is desired to selectively produce the D waveform shown in FIG. 5D, the pulse generator and sequencer 40 is actuated to produce three pulses 2D1, 2D2, and 2D3. These pulses are actually the inversion of the pulses 2C1, 2C2 and 2C3 illustrated in FIG. 2C. Hence, the pulses 2D1, 2D2 and 2D3 tend to generate within the passive raised cosine network raised cosine waveforms 4D1, 4D2 and 4D3 illustrated in FIG. 4D. The resulting output is a composite of these waveforms to produce the D waveform illustrated in FIG. 4D and FIG. 5D.

The pulse sequencers 10, 20, 30 and 40, when taken with the buffer adder 50 and the raised cosine network 60, constitute matched filters for the waveforms A, B, C and D shown in FIG. 5. A detailed description of these waveforms and their use in transmitting information is disclosed in copending application Serial No. 833,450, filed August 13, 1959, entitled "Signal Transmission System" by Richard R. J. Filipowsky, mentioned above. Being matched filters when a pulse is applied to the input of the filter the waveform to which they are matched will be produced at the output. Additionally, if the same waveform is applied to the input of the filter to which it is matched the output of the filter will have a maximum output at the end of the signal interval of the input waveform. If the waveform is inverted and applied to the same filter the output will be at a maximum at the end of the signal interval of the input waveform but will have a polarity opposite to the polarity of the maximum output of the non-inverted form of the waveform. More specifically, if an A waveform is applied to the filter matched to the A and B waveforms it will have a maximum output opposite in polarity to the maximum output when a B waveform is applied to the same filter. Both of these maximum output voltages will occur at the end of signal interval of the input signal. Likewise if a C waveform is applied to the filter matched to the C and D waveforms it will have a maximum output opposite in polarity to the maximum output voltage when a D waveform is applied to the same filter. Both of these maximum outputs will also occur at the end of the signal interval of the input signal.

Figure 6:
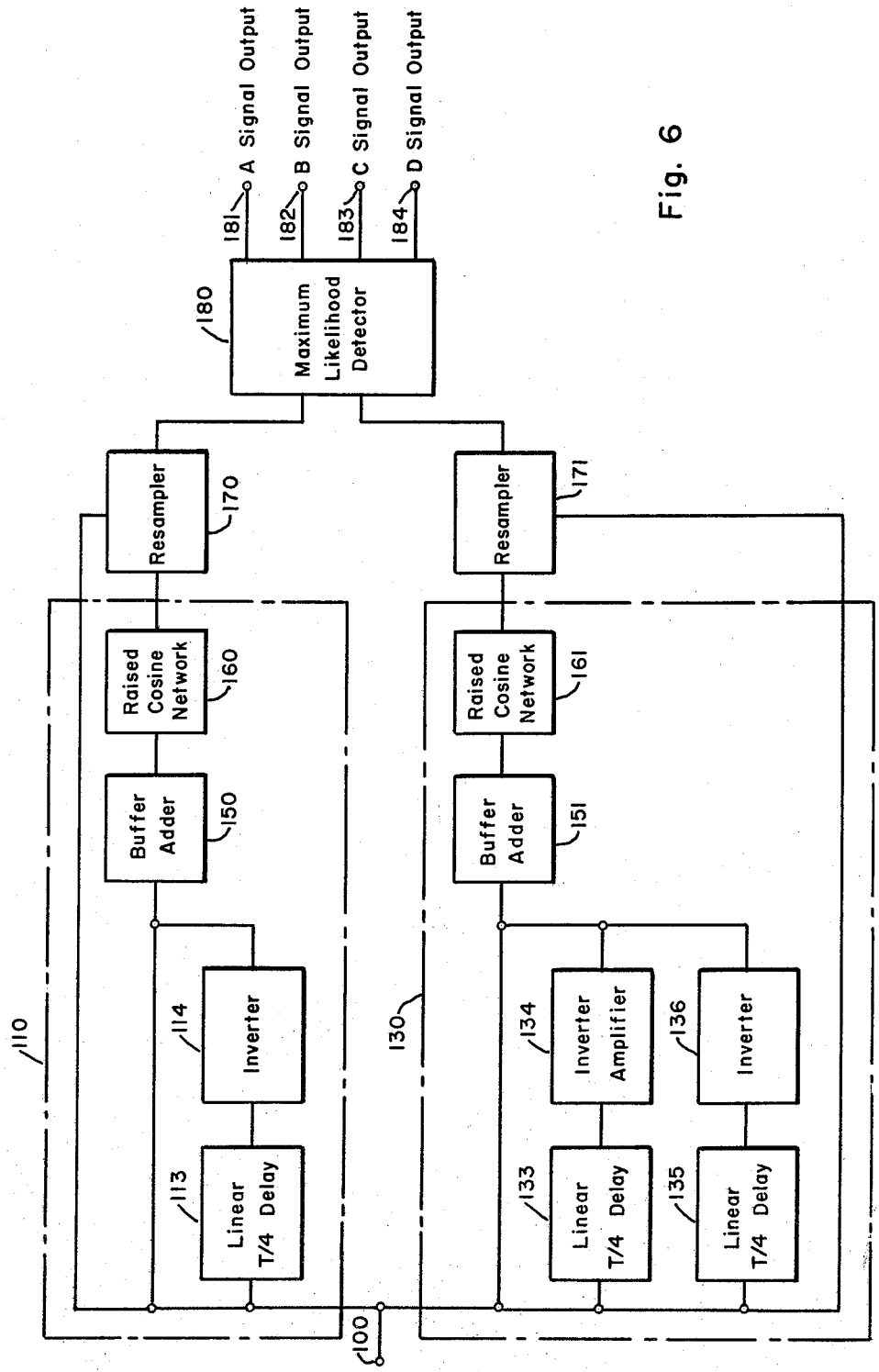
FIG. 6 illustrates a schematic diagram in block form of an embodiment of the invention.

FIG. 6 illustrates a detector which utilizes the above characteristic of the matched filters to detect whether an A, B, C or D waveform has been transmitted. This detector samples the output of a filter matched to an A and B waveform and a filter matched to a C and D waveform, at the end of the signal interval of the input signal. A maximum likelihood detector determines which of the two filters probably has a maximum output at this time to thereby determine that either an A or B waveform has been transmitted or a C or D waveform has been transmitted. The polarity of this maximum then is utilized to determine which of the two waveforms of the selected pair of waveforms has been received.

As can be understood delay 13, inverter 14, adder 50 and raised cosine network 60, constitutes a filter matched to the A and B waveforms. Delay 33, inverter 34, delay 35, adder 50 and cosine network 60 constitute a filter matched to the C and D waveforms. These two filters are employed in the detector shown in FIG. 6 with the filter matched to the A and B waveforms illustrated by numeral 110 and the filter matched to the C and D waveforms illustrated by numeral 130. Filter 110 comprises a $T/4$ linear delay 113, an inverter 114 buffer adder 150, and a raised cosine network 160. Filter 130 comprises a $T/4$ linear delay 133, inverter amplifier 134, $T/4$ linear delay 135, inverter 136, buffer adder 151 and a raised cosine network 161. These components of the matched filters 110 and 130 are the same as the above described components of the matched filters utilized in the generator shown in FIG. 1.

Resamplers 170 and 171 are connected to the outputs of the matched filters 110 and 130 respectively. These resamplers are actuated by the input signals to sample the outputs of the matched filters 110 and 130 and the end of the signal interval of the input signal. This is done by a connection between the input terminal means 100 and the resamplers 170 and 171. Since the time length of the A and B and the C and D waveforms is known the resamplers can be set to sample the output of the filters 110 and 130 for a period of time commencing a predetermined time after the beginning of an input signal. The resamplers 170 and 171 are connected to a maximum likelihood detector 180 which determines which of the two filters 110 and 130 has the maximum output during the sampling period. The detector 180 determines which of the two filters 110 and 130 has an output, during the sampling period, that is closest to a predetermined maximum output. The polarity of this output then determines which of the two waveforms, to which the filter is matched, was received. An output from one of the output terminals 181, 182, 183 or 184 indicates which of the four waveforms was received.

Although the invention has been described above, it will be understood the invention is not limited to the specific embodiment illustrated since the principle of the invention can be applied in various ways. More specifically, the second or third pulses generated by the pulse generators and sequencers 10, 20, 30 and 40 could be generated in several ways other than the one shown in the drawings and described in the specification.

I claim as my invention:

1. A waveform generator comprising a matched filter for producing a waveform of a predetermined shape and time length T in response to a pulse being applied thereto, means operatively connected to the input of said filter for producing two pulses spaced a time distance less than T in response to a pulse being applied thereto.

2. A waveform generator comprising a matched filter for producing a unidirectional waveform of a predetermined shape and time length T in response to a pulse being applied thereto, means for producing two pulses spaced less than time length T and of opposite polarity in response to a pulse being applied thereto, and said means being operatively connected to the input of said matched filter.

3. A waveform generator for producing a bidirectional waveform of a predetermined shape comprising, a matched filter for producing a given waveform in response to a pulse being applied thereto, said given waveform having gradually increasing and gradually decreasing leading and trailing edges respectively, and having a time length equal to T, means operatively connected to said matched filter for producing two pulses of opposite polarity and spaced a time $T/4$.

4. A waveform generator for producing a bidirectional waveform of a predetermined shape comprising, a matched filter for producing a given waveform in response to a pulse being applied thereto, said waveform being a uni-directional raised cosine shape and having a time length equal to T, a pulse generator for producing an output pulse of a predetermined magnitude in response to an input pulse being applied thereto, a second pulse generator for producing a second pulse opposite in polarity to said first pulse and delayed a time $T/4$ after said first pulse, in response to said first pulse, and the output of said generator and said second generator being operatively connected to the input of said matched filter.

5. A waveform generator for producing a bidirectional waveform of a predetermined shape comprising, a matched filter for producing a given waveform of a time length T in response to a pulse being applied thereto, said waveform being uni-directional and having a raised cosine shape, a first pulse generator for producing an output pulse of a predetermined magnitude in response to an input pulse being applied thereto, a second generator for producing a second pulse in response to said first pulse and opposite in polarity thereto, a third generator responsive to said second pulse for producing a third pulse of predetermined magnitude and opposite in polarity to said second pulse, said first, second and third pulse being spaced a time distance less than T, and the output of said first, second and third generators being operatively connected to said matched filter.

6. A waveform generator for producing a bidirectional waveform of a predetermined shape comprising, a matched filter for producing a given waveform in response to a pulse being applied thereto, said waveform being uni-directional and having a raised cosine shape, said given waveform having a time length of T, first generator means for producing a first output pulse of a predetermined magnitude in response to an input pulse, a second generator responsive to said first input pulse for producing a second pulse opposite in polarity to said first pulse and having a magnitude twice the magnitude of said first pulse, third generator means responsive to said second pulse for producing a third pulse opposite in polarity to said second pulse and having a magnitude equal to the magnitude of said first pulse, said first, second and third pulse being spaced a time distance less than T, and the output of said first, second and third generators being operatively connected to said matched filter.

7. A waveform generator for producing a bi-directional waveform of a predetermined shape comprising, a matched filter for producing a given waveform in response to a pulse being applied thereto, said given waveform being uni-directional and having a raised cosine shape with a time length equal to T, first generator means for producing a first output pulse of a predetermined magnitude in response to a trigger input pulse, second generator means responsive to said first pulse for producing a second pulse opposite in polarity to said first pulse and spaced a time $T/4$ from said pulse, said second pulse having a magnitude twice the magnitude of said first pulse, third generator means responsive to said second pulse for producing a third pulse delayed a time $T/4$ after said second pulse, the magnitude of said third pulse being equal to the magnitude of said first pulse, and said first, second and third generator means operatively connected to said matched filter.

8. A waveform generator for producing a bi-directional waveform of a predetermined wave shape comprising, means for effecting production of a first uni-directional waveform having gradually increasing and gradually decreasing leading and trailing edges respectively, a second means for effecting production of a second uni-directional waveform having gradually increasing and gradually decreasing leading and trailing edges respectively, said second waveform being opposite in polarity to said first waveform and occurring after the beginning and before the end of said first waveform, to thereby effect generation of said bi-directional waveform of a predetermined shape as a composite of said first waveform and said second waveform.

References Cited in the file of this patent

UNITED STATES PATENTS

| | | |
|---|---|---|
| 2,429,844 | Rothman et al. | Oct. 28, 1947 |
| 2,438,910 | Grieg | Apr. 6, 1948 |
| 2,579,473 | Chatterjea | Dec. 25, 1951 |
| 2,794,123 | Younker | May 28, 1957 |
| 2,795,775 | De Faymoreau et al. | June 11, 1957 |
| 2,820,909 | Plouffe | Jan. 21, 1958 |
| 2,855,509 | Moore | Oct. 7, 1958 |